2 Sheets—Sheet 1.
R. M. MACINTOSH.
APPARATUS FOR FORMING A KNOTLESS THREAD.
No. 11,296. Reissued Dec. 27, 1892.
Fig. 1.
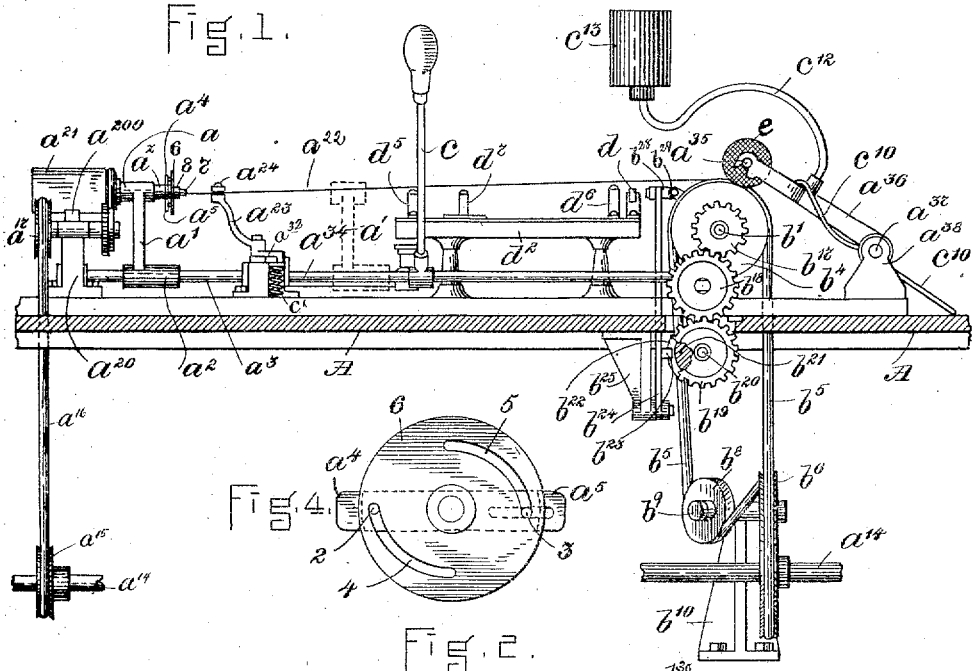
Fig. 4.
Fig. 2.
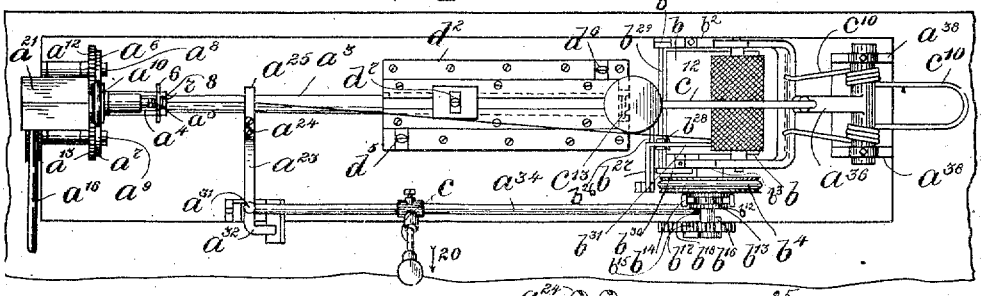
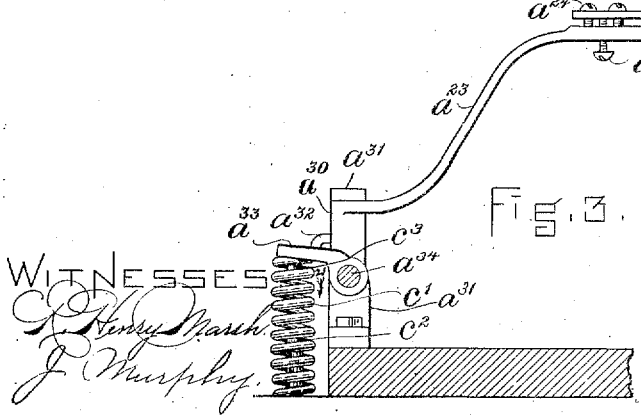
Fig. 3.
WITNESSES
R. Henry Marsh
J. Murphy.
INVENTOR.
Robert M. Macintosh,
by Jas. H. Churchill
Atty.

R. M. MACINTOSH.
APPARATUS FOR FORMING A KNOTLESS THREAD.
No. 11,296. Reissued Dec. 27, 1892.
Fig. 5.
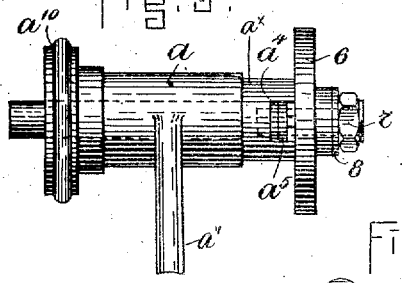
Fig. 6.
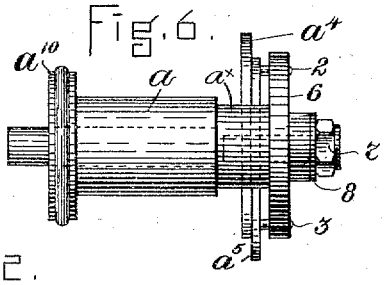
Fig. 12.
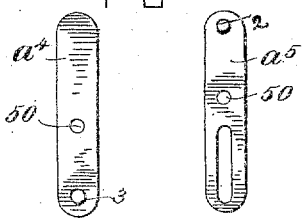
Fig. 13.
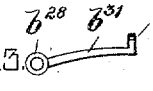
Fig. 7.
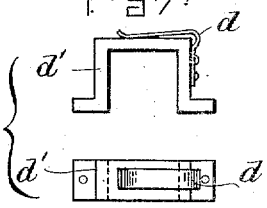
Fig. 8.
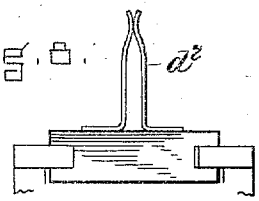
Fig. 9.
Fig. 10.
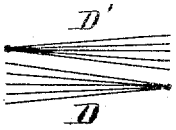
Fig. 11.
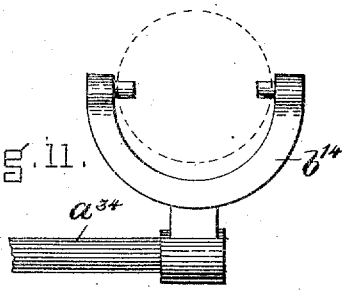
Fig. 10a.
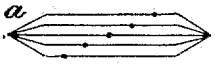
WITNESSES.
R. Henry Marsh.
J. Murphy.
INVENTOR.
Robert M. Macintosh,
by Jas. H. Churchill
Atty.

UNITED STATES PATENT OFFICE.

ROBERT M. MACINTOSH, OF BOSTON, MASSACHUSETTS.

APPARATUS FOR FORMING A KNOTLESS THREAD.

SPECIFICATION forming part of Reissued Letters Patent No. 11,296, dated December 27, 1892.

Original No. 484,212, dated October 11, 1892. Application for reissue filed November 14, 1892. Serial No. 452,012.

*To all whom it may concern:*

Be it known that I, ROBERT M. MACINTOSH, a citizen of the United States, residing at Boston, in the county of Suffolk and State of Massachusetts, have invented an Improvement in Apparatus for Forming a Knotless Thread, of which the following description, in connection with the accompanying drawings, is a specification, like letters and figures on the drawings referring to like parts.

This invention relates to a novel apparatus for the treatment of thread composed of a plurality of individual strands twisted together.

The thread now commonly used with boot and shoe stitching or sewing machines, is composed of a number of individual strands and is made up of a number of pieces, sections, or lengths, having their ends tied together by hand into a firm knot. The knots in the thread thus formed, are usually too large to pass through the eye of the needles of boot and shoe stitching or sewing machines, and as a result, the said needles are frequently broken.

My invention has for one of its objects, to form a continuous thread from pieces, lengths or sections of thread, composed of a plurality of strands, which is free from knots and which is thus made especially adapted for use on boot and shoe stitching or sewing machines.

My invention further consists in an apparatus of novel construction, as will be described, upon which the continuous thread may be made, and upon which it may be wound into compact form, preferably into the form of a spool or cylinder. The apparatus referred to is also provided with a knot-catcher or stopping device, operated by a knot in the thread to automatically stop the apparatus, to permit the knot to be removed from the thread.

Other features of my invention will be pointed out in the claims at the end of this specification.

Figure 1, is a rear elevation of an apparatus with which to practice my invention. Fig. 2, a top or plan view of the apparatus shown in Fig. 1. Fig. 3, a detail on an enlarged scale of the knot-catcher or automatic stopping device. Figs. 4, 5, and 6, details to be referred to. Figs. 7 and 8, details of the strand-uniting portion of the machine, to be referred to. Figs. 9 and 10, diagrams to more clearly show the manner of uniting the ends of two pieces of thread to form a continuous knotless thread. Fig. 10[a], a diagram showing the untied strands. Fig. 11, a detail to be referred to. Fig. 12, a detail of the nippers or clamping bars to be referred to, and Fig. 13, a detail to be referred to.

The bed-plate or table A, supporting the operating parts of my improved apparatus, may and preferably will be supported upon a floor or other foundation by suitable legs, not herein shown. The apparatus referred to, is preferably made as herein shown, it consisting essentially of three parts or portions, viz.—a twisting and untwisting portion, a winding portion, and an intermediate strand-uniting portion. The twisting and untwisting portion of the apparatus, preferably made as herein shown, consists essentially of a thread-guide, shown as a hollow sleeve or shaft $a$, supported in an upright arm $a'$ on the hub $a^2$, keyed on a rock-shaft $a^3$ and adapted to be moved longitudinally on said shaft. The thread-guide $a$ is provided at one end with a thread-holding device, preferably made as herein shown, it consisting of two nippers or clamps $a^4$ $a^5$, made as flat bars extended through a slot in the hub $a^x$ on the sleeve or thread-guide $a$, the said bars being provided near their opposite ends with studs or pins 2, 3, extended into cam or eccentric slots 4, 5, in a disk 6, loose on the sleeve $a$ and secured in place thereon, as herein shown, by a nut 7, which is screwed upon the end of the sleeve or thread-guide $a$, the said disk being frictionally held in proper position on the hub by a leather or rubber washer 8 interposed between the disk 6 and nut 7.

The nipping-bars or clamps $a^4$ $a^5$ are provided near their center with openings 50 (see Fig. 12), through which the thread $a^{22}$ may pass, when the said bars are in their outermost position, as represented in Fig. 4. The bars $a^4$ $a^5$ are adapted to be moved inward by turning the disk $a^6$, so that the eccentric or cam-shaped slots 4, 5, will force the two bars toward the center of the sleeve $a$, and thereby nip or firmly grip the thread between them and hold the same, the pins 2, 3 at such time occupying the dotted line position shown in Fig. 4.

The sleeve $a$ may be rotated in opposite directions, as herein shown, by gearing which preferably consists of two friction wheels or disks $a^6$ $a^7$, fast on shafts or arbors $a^8$ $a^9$, and with which co-operates a friction disk $a^{10}$, fast on the sleeve $a$. The shafts $a^8$ $a^9$ have fast on them two gear-wheels $a^{12}$ $a^{13}$ in mesh with each other, and by means of which the friction disks $a^6$ $a^7$ are rotated in opposite directions. One of the shafts $a^8$ $a^9$ may be positively driven from a main shaft $a^{14}$, herein shown as located below the table A, it being supported in suitable bearings not shown. The main shaft $a^{14}$ is provided, as herein shown, with a pulley $a^{15}$ connected by the belt $a^{16}$ to a pulley $a^{17}$ on the shaft $a^9$. The shafts $a^8$ $a^9$ are supported in a suitable standard or upright $a^{20}$ provided, as herein shown, with the upright arm $a^{200}$, which supports the thread-guard or shield $a^{21}$, herein shown as a substantially V-shaped piece of metal, by means of which the thread $a^{22}$ is protected from any oil or dirt, which might be thrown off by the gears $a^{12}$ $a^{13}$. Normally the upright arm $a'$ stands in a substantially vertical position and the friction disk $a^{10}$ is out of contact with the friction disks $a^6$ $a^7$, and the thread-carrying sleeve $a$ is, at such time, at rest or not in motion. The thread $a^{22}$, after leaving the sleeve $a$ is passed through a knot-catcher, herein shown as two jaws, made as bars $a^{25}$ $a^{250}$, secured together, as shown, by set screws $a^{24}$, the jaw $a^{250}$ being shown as forming part of an arm $a^{23}$, secured to a hub $a^{30}$ loose on a post or upright $a^{31}$ attached to the table A. The jaw or arm $a^{25}$ is separated from the jaw or arm $a^{250}$ a sufficient distance to permit the thread, when free from knots, to pass freely between them, but which distance is not sufficient to permit a knot in the thread to pass therethrough. The distance between the jaws or arms $a^{25}$ $a^{250}$ may be regulated to correspond to the size of the thread being operated upon, by means of an adjustable stop, shown as a screw $a^{260}$, which is extended up through the jaw $a^{250}$ and against which the jaw $a^{25}$ abuts, when the latter is secured to the jaw $a^{250}$ by the set screws $a^{24}$.

The hub $a^{30}$ has secured to it a second arm $a^{32}$, which co-operates with an arm $a^{33}$ on a rock-shaft $a^{34}$, having bearings in the post or upright $a^{31}$, and in a second support or upright located near the opposite end of the bed-plate, and not herein shown. The thread $a^{22}$, after leaving the knot-catcher, passes over the strand-uniting portion of the machine, to be hereinafter described, and as herein shown, is secured on a bobbin $a^{35}$, detachably carried by a bobbin-holder, shown as a forked arm or yoke $a^{36}$, mounted on a shaft $a^{37}$ supported in suitable uprights $a^{38}$ secured to the bed-plate or table A.

The winding portion of the machine consists essentially as herein shown, of a winding drum or cylinder $b$ mounted on a shaft $b'$ supported in suitable bearings, herein shown as uprights or standards $b^2$ $b^3$ attached to or supported by the table A. The winding-drum shaft $b'$ has loosely mounted on it a pulley $b^4$, connected by a belt $b^5$ to a main driving pulley $b^6$, fast on the main shaft $a^{14}$, the said belt, as herein shown, passing under intermediate guide pulleys, only one, $b^8$, of which is shown, mounted on a shaft $b^9$, supported in an upright $b^{10}$ attached to the floor or other suitable foundation. The loose pulley $b^4$ has secured to or forming a part of it, a clutch hub $b^{12}$ of any usual or well-known construction, it being provided with the annular groove $b^{13}$, engaged by the forked arm $b^{14}$ secured to the rock-shaft $a^{34}$. The clutch hub $b^{12}$ is provided with preferably two lugs $b^{15}$ on its face, which are adapted to be brought into engagement with corresponding lugs $b^{16}$ on a gear or pinion $b^{17}$ fast on the shaft $b'$.

The pinion $b^{17}$ meshes with an intermediate gear $b^{18}$, in mesh with a gear $b^{19}$ fast on a shaft $b^{20}$, on which is mounted a cam hub $b^{21}$ provided with a cam groove $b^{22}$, into which is extended a stud or projection $b^{23}$ on a vibrating arm or lever $b^{24}$, herein shown as pivoted at its lower end to a bracket $b^{25}$, secured to the underside of the table A. The vibrating arm $b^{24}$ is extended up through a slot $b^{26}$ in the table A, and is connected by a link $b^{27}$ to a hub or sleeve $b^{28}$, loosely mounted on a rod $b^{29}$, extended the length of the winding drum $b$ and supported in suitable arms $b^{30}$, secured to or forming part of the uprights $b^2$ $b^3$.

The hub $b^{28}$ has secured to or forming part of it an arm $b^{31}$, extended over the winding drum $b$ and provided at its end with an eye, through which the thread $a^{22}$ is passed, the said arm and eye forming a reciprocating thread-guide by which the thread is carried from one end of the bobbin toward the other. The reciprocating thread-guide is actuated by the engagement of the clutch hub $b^{12}$, with the gear $b^{17}$ which is accomplished with the mechanism shown, by rocking the shaft $a^{34}$ so as to bring the lugs $b^{15}$ on the clutch hub into engagement with the lugs $b^{16}$ on the pinion or gear $b^{17}$. The shaft $a^{34}$ may be rocked into its starting position by means of a handle $c$, which is turned down in the direction indicated by arrow 20 Fig. 2, and when the handle $c$ is thus turned, the arm $a^{33}$ on the rock-shaft is moved downward in the direction of arrow 21, Fig. 3, and the knot-catcher is then turned to engage the arm $a^{32}$ with the arm $a^{33}$ of the rock-shaft, and when in this position, the thread $a^{22}$ may be inserted between the jaws or arms $a^{25}$ $a^{250}$ of the knot-catcher. The rock-shaft $a^{34}$ is automatically turned in a direction opposite to that indicated by arrow 20, preferably by a spring $c'$, herein shown as encircling a post or upright $c^2$ on the table A, and a stud or pin $c^3$ on the under side of the rocker-arm $a^{33}$.

The operation of the apparatus as thus far specified, may be described as follows,—the thread $a^{22}$, after being passed through the thread-guide or sleeve $a$ and through the jaws $a^{25}$ $a^{250}$ of the knot-catcher, is secured to the bobbin $a^{35}$, and the latter is then placed in the bobbin-holding arms $a^{36}$, and the latter are lowered to bring the thread on the bobbin in contact with the winding drum $b$. The thread on the bobbin is maintained in contact with the surface of the winding drum, as herein shown, by means of a spring $c^{10}$ wound about the shaft $a^{37}$, and one end of which engages the bobbin-holding arms $a^{36}$, and the other end of which bears against the table A, the bobbin-holding yoke having secured to it an arm $c^{12}$ provided with a weight $c^{13}$, to assist the spring $c^{10}$ in obtaining the desired frictional contact between the thread and the winding drum. After the end of the thread $a^{22}$ has been wound upon its bobbin and brought in contact with the winding drum $b$, the winding drum may be started in rotation, by turning the handle $c$ in the direction indicated by arrow 20, so as to engage the clutch hub $b^{12}$ with the pinion $b^{17}$, thus producing rotation of the winding drum, and at the same time reciprocating the thread-guide $b^{31}$. The clutch hub is maintained in engagement with the pinion $b^{17}$ by means of the arm $a^{32}$ of the knot-catcher, which is brought over upon the arm $a^{33}$ of the rock-shaft $a^{34}$, as shown in Fig. 2, when the knot-catcher is turned into its operative position, represented in Figs. 1 and 2. The machine continues to run and the thread is wound upon its bobbin $a^{35}$ until a knot in the thread engages the knot-catcher, and when this takes place, the arm $a^{23}$ is turned on its pivot or post $a^{31}$, and the arm $a^{32}$ of the knot-catcher is disengaged from the rocker-arm $a^{33}$, thereby permitting the spring $c'$ to move the rock-shaft $a^{34}$ in a direction opposite to that indicated by arrow 20, and move the clutch hub $b^{12}$ and its pulley out of engagement with the pinion $b^{17}$, thus stopping the winding motion of the drum $b$. The operator then proceeds to remove the knot from the thread in the following manner. The disk 6 is first turned so as to cause the nippers or clamps $a^4$ $a^5$ to firmly pinch or grasp the thread near the thread-guide $a$, and the portion of the thread near the winding drum is then also firmly clamped by inserting it under a spring jaw $d$, shown separately in Fig. 7, and which is secured to an upright $d'$, on a supplemental table $d^2$ supported upon the table A by posts $d^3$. It will thus be noticed that the portions of the thread on either side of the knot are firmly clamped, and the length of thread between the clamps may be represented as shown in Fig. 9. The operator then rocks the shaft $a^3$, so as to bring the friction wheel or disk $a^{10}$ into engagement with one of the friction disks or wheels $a^6$ $a^7$, according to which wheel will produce the desired rotation of the thread, to untwist that portion between the nippers $a^4$ $a^5$ and the spring clamp $d$. Let it be supposed that the friction disk $a^6$, when engaged by the friction wheel $a^{10}$, will rotate the sleeve $a$ in the direction to untwist the knotted portion of the thread. After the knotted portion of the thread has been untwisted, the operator moves the hub $a^2$ longitudinally on the rock-shaft $a^3$ toward the winding drum or into a position substantially as represented by dotted lines in Fig. 1, which is preferably about half way between the clamp $d$ and the original or full line position of the thread-guide $a$. From this it will be seen, that the portion of the thread on either side of the knot between the nippers $a^4$ $a^5$ and the spring clamp $d$ is thus made slack. The operator then takes the slack ends and by means of a needle or other fine instruments separates the individual strands on opposite sides of the knot, after which the knot is cut off from the thread, leaving the slack portions of the thread severed into two parts D D′, as shown on an enlarged scale in Fig. 10. The operator then places the end D of the slack portion in the spring clamp $d^5$, and the portion D′ in the spring clamp $d^6$ located diagonally opposite on the table $d^2$. The next step in the process consists in uniting the individual strands of the end portions D D′, which is accomplished, as herein shown, by taking two strands of the end portions D D′ and placing them between the jaws of a movable spring clamp $d^7$, which is first moved toward one end of the machine, as for instance, at the end nearest the winding drum, and after the two individual strands have been inserted between the spring jaws of the clamp $d$, so that they are substantially taut, the said strands are united by a square knot. After these two strands have been united, they are removed from the spring clamp $d^7$, and the latter is moved on the table $d^2$ away from the winding drum a suitable distance, according to the number of strands in the thread being united, as for instance, if the thread is composed of five strands, as herein represented, the movable spring clamp $d^7$ is moved away from the winding drum substantially one fifth of the length of the table $d^2$, and when in this position, two more individual strands of the portions D D′ are inserted between the jaws of the said spring clamp, and united by a square knot, after which the spring clamp $d^7$ is moved away from the winding drum $b$ another fifth of the length of the table, and two more of the individual strands are united by a square knot. This operation continues until all the individual strands have been united, after which the loose ends or surplus portions of the individual strands beyond the knot, are cut off, and a substantially small or indiscernible knot is left in each strand. When the strands of the portions D D′ are united, and their loose ends severed, the knots in the individual strands will appear in the strands substantially as represented in the diagram, Fig. 10[a], and it will be noticed that the length of threads between the clamps has been shortened substantially one-half of its original length, represented in Fig. 9. After the individual strands of the loose portions D D′ have been united as described, the cam disk 6 is turned so as to unclamp the thread, and the latter is automatically twisted by the extra twist put in that portion of the thread behind the clamps $a^4$ $a^5$ in the original position of the thread-guide $a$. This extra twist in that portion of the thread behind the thread-guide clamps $a^4$ $a^5$, is put into the said portion of the thread, when the thread-guide $a$ is rotated to untwist the knotted portion, that is, when the friction disk $a^{10}$ is brought into contact with the friction disk $a^6$. When the cam disk 6 has been turned to release the thread from the clamps or nippers $a^4$ $a^5$, the hub $a^2$ is moved back on its rock-shaft $a^3$ into its normal or starting position, and the cam disk is then turned to again clamp the thread between the nippers $a^4$ $a^5$, after which the friction disk or wheel $a^{10}$ is brought in contact with the friction disk or wheel $a^7$, to still further twist the portion of the thread which has been united, and in practice, I prefer to give the thread a few extra twists by means of the friction disk $a^7$. After the extra twists referred to, have been put into the thread as described, the disk 6 is turned to release the thread, and when the thread is thus released, the extra twists referred to will extend in both directions and equalize themselves.

When the knotted individual strands of the thread are twisted, the knot in each individual strand is covered or concealed by the remaining strands of the thread, so that, when the united portion of the thread has imparted to it the original number of twists, the surface of the thread will be entirely free from knots, and will be smooth and of substantially the same diameter as the unknotted portion of the thread. After the strands have been united as described, and the united portion given the desired number of twists, the operator again starts the machine in operation, by bringing the clutch-hub $b^{12}$ into engagement with the pinion $b^{17}$, and then placing the knot-catcher in its operative position shown in Figs. 1 and 2. The machine continues to run and winds the thread upon the bobbin $a^{35}$ until it is again automatically stopped by a knot, or if the remaining portion of the thread should be free from knots, until the machine is positively stopped by the operator disengaging the clutch-hub $b^{12}$ from the pinion $b^{17}$.

By means of the thread-guide $b^{31}$ extended over the surface of the winding drum toward the bobbin, the distance between the eye of the thread-guide $b^{31}$ and the outside or periphery of the ball of thread, is maintained substantially constant, irrespective of the diameter of the ball, and in this way a finer or closer winding is effected, and a smaller and more compact roll $e$, having a substantially square end is obtained.

When the machine is first started, the bobbin $a^{35}$ is in contact with the winding drum, and the distance between the surface of the bobbin and the eye of the thread-guide $b^{31}$, is the same as the distance between the eye of the thread-guide $b^{31}$ and the outside of the ball $e$ after the latter has been formed, and during all stages of the formation of the ball. In this manner the thread between the eye of the thread-guide $b^{31}$ and the ball is always kept under tension and straight, so that a closer winding is effected, and the ends of the ball or roll are substantially square or at right angles to the axis of the ball or roll. By making the jaws $a^{25}$ $a^{250}$ adjustable, as described, any desired thickness of thread may be treated.

I have herein shown one form of winding mechanism but I do not desire to limit my invention in this respect, as it is evident, that the twisting and untwisting portion and the strand-uniting portion of the apparatus may be used with other forms or constructions of winding mechanism.

I claim—

1. In an apparatus for forming a knotless thread from a knotted thread composed of a plurality of strands, the combination of the following instrumentalities, viz.—a thread untwisting and twisting portion, consisting of a thread-guide, a clamp or thread-holding device, and means to actuate the said thread-guide to untwist the thread, a winding mechanism consisting of a cylinder or drum, a mechanism to operate it, and a reciprocating thread-guide, and an intermediate strand-uniting portion consisting of stationary strand-holders and a movable strand-holder clamp, substantially as described.

2. In an apparatus for forming a knotless thread from a knotted thread composed of a plurality of strands, the combination of the following instrumentalities, viz:—a winding mechanism consisting of a cylinder or drum, a bobbin-holder co operating therewith, a driving mechanism for said winding mechanism, a reciprocating thread-guide movable in the direction of the length of the cylinder or drum, a clutch to couple the winding mechanism, and a knot-catcher provided with jaws between which the thread is passed and one of which is adjustable toward the other to correspond to the size of thread being operated upon, the said knot-catcher controlling the operation of the clutch in one direction and operated by a knot in the thread to actuate the clutch and disengage the winding mechanism from its driving mechanism, substantially as described.

3. In an apparatus for forming a knotless thread from a knotted thread composed of a plurality of strands, the combination of the following instrumentalities, viz.—a thread-guide and a clamp or thread-holding device, a winding mechanism, a driving mechanism for said winding mechanism, a reciprocating thread-guide co-operating with the winding mechanism, a clutch to couple the winding mechanism to the driving mechanism, a knot-catcher intermediate of the clamp and the winding mechanism controlling the operation of the clutch in one direction, and operated by a knot in the thread to actuate the clutch as described, and a strand-uniting portion consisting of stationary strand-holders and a movable strand-holding clamp, substantially as described.

4. In an apparatus for forming a knotless thread from a knotted thread composed of a plurality of strands, the combination of the following instrumentalities, viz:—a thread untwisting and twisting portion, consisting of a hollow thread-guide $a$, a hub $a^2$ to which it is connected, a rock-shaft $a^3$ on which the hub $a^2$ is mounted to rock therewith and to move longitudinally thereon, means to revolve the thread-guide $a$ in opposite directions, a thread-clamping device carried by the said thread-guide, a winding portion consisting of a winding drum or cylinder $b$, a bobbin-holder co-operating therewith, a mechanism to rotate said drum or cylinder, a clutch to connect the winding drum or cylinder with the driving mechanism, a reciprocating thread-guide, and means to reciprocate the same, and a knot-catcher normally controlling the operation of the said clutch and adapted to be operated by a knot in the thread to permit the clutch to be operated to disengage the winding drum or cylinder from its driving mechanism, substantially as described.

5. The hereindescribed strand-uniting mechanism, consisting of a table or support $d^2$, stationary strand-holders $d^5$ $d^6$ mounted thereon, and a movable strand-holder $d^7$, substantially as described.

6. The combination with the cylinder $b$ mounted on a table A, and mechanism to operate it, of a sleeve or hub $b^{28}$ loosely mounted on the rod $b^{29}$, an arm $b^{31}$ secured to or forming part of the sleeve $b^{28}$ and extended over the cylinder $b$ and provided at its end with an eye, a vibrating arm $b^{24}$ pivoted below the said table and extended up through the same, a link $b^{27}$ joining the said vibrating arm with the sleeve, a cam to vibrate said arm, a bobbin-holder co-operating with the cylinder $b$, and means to press the bobbin-holder toward the said cylinder and keep the thread in engagement with the cylinder $b$, substantially as described.

7. In an apparatus for forming a knotless thread from a knotted thread composed of a plurality of strands, the combination of the following instrumentalities, viz:—a thread untwisting and twisting portion, consisting of a thread-guide, a clamp or thread-holding device, and means to actuate the said thread-guide to untwist the thread, a winding mechanism consisting of a cylinder or drum, mechanism to operate it, and a reciprocating thread-guide, and an intermediate strand-uniting portion consisting of one or more holders for the individual strands, substantially as described.

8. In an apparatus for forming a knotless thread from a knotted thread composed of a plurality of strands, the combination of the following instrumentalities, viz:—a thread-guide and a clamp or thread-holding device, a winding mechanism, a driving mechanism for said winding mechanism, a reciprocating thread-guide co-operating with the winding mechanism, a clutch to couple the winding mechanism to the driving mechanism, a pivoted knot-catcher intermediate of the clamp and the winding mechanism and having one arm provided with jaws through which the thread is passed and its other arm co-operating with and controlling the operation of the clutch in one direction and operated by a knot in the thread to actuate the clutch as described, and a strand-uniting portion consisting of one or more strand-holders, substantially as described.

9. The combination with a thread untwisting and twisting portion consisting of a thread-guide, a clamp or thread-holding device, and means to actuate the said thread-guide to untwist the thread, of a strand-uniting portion consisting of one or more holders for the individual strands, and a winding mechanism upon which the knotless thread is wound, substantially as described.

10. The combination with a thread untwisting and twisting portion consisting of a thread-guide, a clamp or thread-holding device to clamp the thread on one side of a knot, and means to actuate the said thread-guide to untwist the thread, of a clamp or holding device to clamp the thread on the other side of the knot, and an intermediate strand-uniting portion consisting of one or more holders for the individual strands, substantially as described.

ROBT. M. MACINTOSH.

Witnesses:
JAS. H. CHURCHILL,
J. MURPHY.